United States Patent
Spitzley et al.

(10) Patent No.: US 8,695,485 B2
(45) Date of Patent: Apr. 15, 2014

(54) APPARATUS AND METHOD FOR PREPARING PRESSED COFFEE

(75) Inventors: Julie D. Spitzley, Oak Creek, CO (US); David M. Dreffer, Huron, OH (US); Carole A. Dreffer, Huron, OH (US)

(73) Assignee: Julie D. Spitzley, Huron, OH (US)

( * ) Notice: Subject to any disclaimer, the term of this patent is extended or adjusted under 35 U.S.C. 154(b) by 0 days.

(21) Appl. No.: 12/840,013

(22) Filed: Jul. 20, 2010

(65) Prior Publication Data

US 2011/0014340 A1    Jan. 20, 2011

Related U.S. Application Data

(60) Provisional application No. 61/226,957, filed on Jul. 20, 2009.

(51) Int. Cl.
*A47J 31/18*    (2006.01)

(52) U.S. Cl.
USPC .......... 99/297; 99/279; 99/295; 99/299; 99/298; 99/318; 99/316; 99/289 R; 99/302 R; 99/323; 99/302 P; 426/433; 426/431; 426/432; 426/425; 426/330

(58) Field of Classification Search
USPC .......... 99/279, 295, 299, 297, 298, 318, 316, 99/289 R, 302 R, 323, 302 P; 426/433, 431, 426/432, 425, 330
See application file for complete search history.

(56) References Cited

U.S. PATENT DOCUMENTS

| | | | |
|---|---|---|---|
| 2,288,284 A * | 6/1942 | Kellogg | 426/331 |
| 3,103,873 A | 9/1963 | Breitenstein | |
| 3,115,822 A | 12/1963 | Totten | |
| 3,657,993 A * | 4/1972 | Close | 99/297 |
| 5,461,968 A * | 10/1995 | Portman | 99/287 |
| 7,849,784 B2 * | 12/2010 | Adler | 99/297 |
| 2009/0095165 A1 | 4/2009 | Nosler et al. | |

OTHER PUBLICATIONS

JP2008-26997 A, Arimura et al., Nov. 6, 2008, Machine English Translation. pp. 1-10.*
JP2008-268997 A, Arimura et al. Nov. 6, 2008, Dewrent English Translation Abstract, pp. 1-2.*
Smith, Barry D., Uma Gupta, and B.S. Gupta, Caffeine and Activation Theory, CRC Press, 2007, pp. 18.*
International Search Report and Written Opinion dated Sep. 15, 2010 for related PCT Application No. PCT/US10/42638 filed Jul. 20, 2010.

* cited by examiner

*Primary Examiner* — Lien T. Tran
*Assistant Examiner* — Hong T Yoo
(74) *Attorney, Agent, or Firm* — HolzerIPLaw, PC

(57) ABSTRACT

In accordance with one embodiment, a pressed coffee maker is provided. The coffee maker can comprise a tank for storing coffee solution; a screen disposed in the tank for pressing coffee grounds in the tank; and a squeegee to clean the tank. A removable bottom can be used to both add new coffee grounds and remove used coffee grounds.

13 Claims, 17 Drawing Sheets

US 8,695,485 B2

APPARATUS AND METHOD FOR PREPARING PRESSED COFFEE

This application claims the benefit of U.S. provisional patent application 61/226,957 filed on Jul. 20, 2009 and titled "Apparatus and Method for Preparing Pressed Coffee," the content of which is hereby incorporated by reference for all purposes.

BACKGROUND

Consumers have become accustomed to paper-filtered coffee. The paper-filtered coffee brewing process involves running hot water across fresh coffee grounds supported by a paper filter. The filter prevents the coffee grounds from entering the coffee tank. Thus, when the coffee is dispensed, it does not contain any coffee grounds. One problem with this use of paper filters, however, is that the paper filter also filters out the oils from the brewed coffee. The oils provide a significant amount of flavor to coffee. Thus, filtering out these oils is detrimental to the taste of the brewed coffee.

Nevertheless, consumers have become accustomed to coffee makers that require paper filters. They are a common fixture in restaurants and businesses where large servings of coffee are brewed. The paper filters allow for much of the mess of brewing the coffee to be removed. Namely, cleaning up used coffee grounds can be messy. Thus, taste has been sacrificed for ease of cleaning and ease of brewing.

One non-paper-filtered coffee maker that is used by a small segment of the coffee drinking population is the manual French Press coffee maker. This type of coffee maker does not utilize a paper filter. As a result, it has a reputation for being a messy way of making coffee. However, it does allow the user to make very good tasting coffee because no paper filters are used. Thus, the taste enhancing oils are not filtered out and form part of the brewed coffee. French press coffee makers are typically manufactured as small volume units. Thus, they are limited to personal use and are not suited to produce large batches of coffee used in commercial settings. Part of the reason for this is that commercial settings prefer easy to clean coffee makers and French press coffee makers have the reputation of being difficult to clean.

SUMMARY

An apparatus for use in brewing coffee, the apparatus comprising a brew chamber; at least one sidewall of the brew chamber; a movable squeegee disposed in the brew chamber; wherein during brewing of a brew of coffee in the brew chamber, the squeegee is operative to squeegee oil disposed on the at least one sidewall back into the brew of coffee; and wherein during cleaning of the brew chamber the squeegee is operative to squeegee from the sidewall material disposed on the at least one sidewall.

A method of brewing coffee, the method comprising adding coffee grounds to a brew chamber; adding solvent to the brew chamber; steeping the coffee grounds in the solvent so as to form a coffee solution; squeegeeing at least one sidewall of the brew chamber so as to squeegee coffee oil from the sidewall into the coffee solution; removing the coffee solution from the brew chamber; removing the used coffee grounds from the brew chamber; squeegeeing material from the at least one sidewall of the brew chamber so as to clean the at least one sidewall of the brew chamber.

An apparatus for brewing coffee comprising a brew chamber body defining a brew chamber, the brew chamber body comprising a brew chamber frame; and a removable bottom; wherein the removable bottom is operative to add fresh coffee grounds to the brew chamber during use of the apparatus; wherein the removable bottom is configured for watertight engagement with the brew chamber frame; and wherein the removable bottom is operative to remove a majority of used coffee grounds from the brew chamber when the removable bottom is disengaged from the brew chamber frame during use of the apparatus.

A method of adding coffee grounds to a brew chamber, the method comprising providing a coffee brewing apparatus comprising a brew chamber body defining a brew chamber, the brew chamber body comprising a brew chamber frame; and a removable bottom; disposing coffee grounds in the removable bottom; coupling the removable bottom with the brew chamber frame so as to place the coffee grounds in the brew chamber; brewing coffee with the coffee grounds so as to create used coffee grounds; removing a majority of the used coffee grounds from the brew chamber by disengaging the removable bottom from the brew chamber frame.

Further embodiments will be apparent from the drawings and specification.

DETAILED DESCRIPTION

Figure 1:
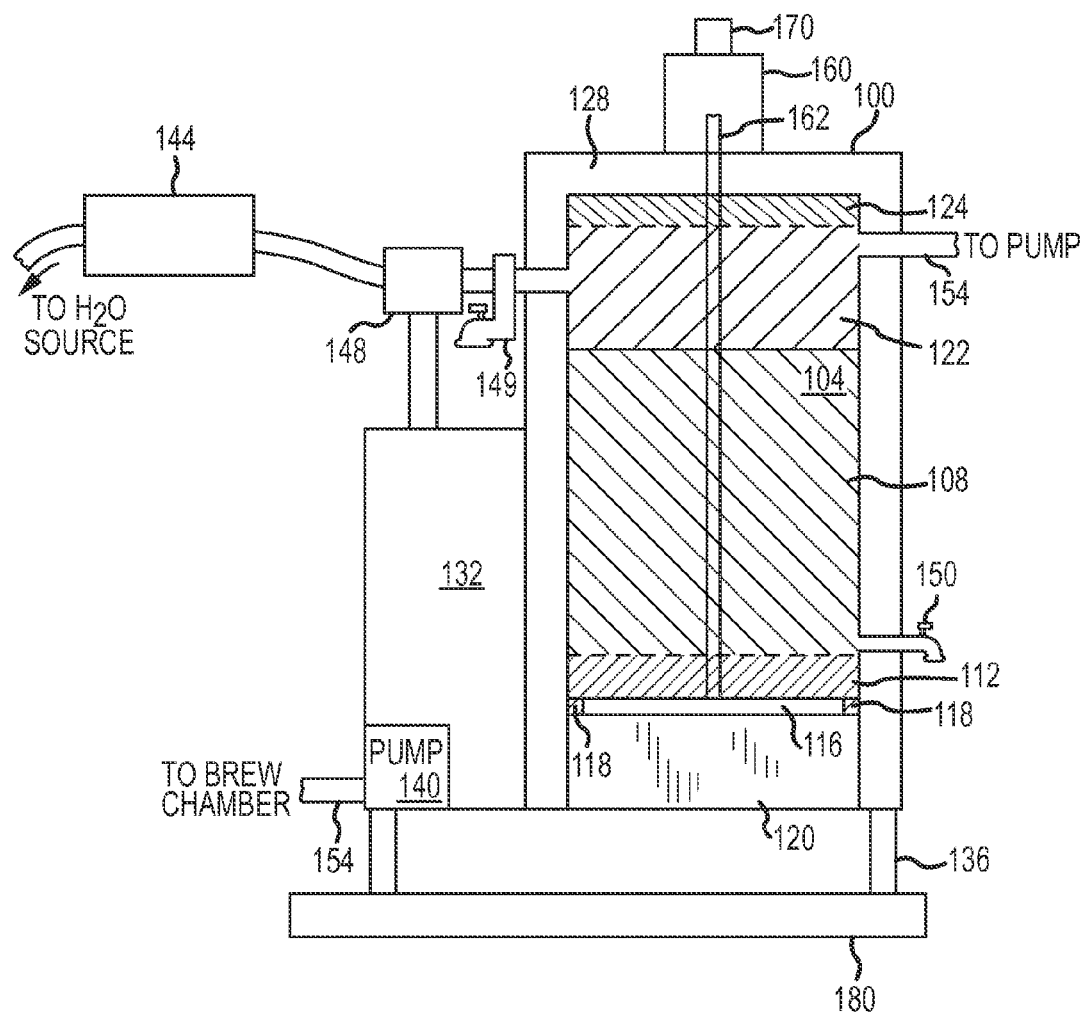
FIG. 1 illustrates a French Press coffee maker in accordance with one embodiment.

In accordance with one embodiment of the invention, a coffee maker is provided. One embodiment of a coffee maker is shown in FIG. 1 where coffee maker 100 is shown having a brew chamber 104 which can be divided into multiple sections. Namely, brew chamber 104 can have a drinkable coffee section 108, a heavy sediment section 112, a foam chamber 122, and a free space chamber 124. The drinkable coffee chamber 108 is configured to typically hold the brewed coffee and allow it to be dispensed from dispenser 150. The drinkable coffee is configured to be above the heavy sediment coffee 112 and thus would avoid dispensing of the less desirable heavy sediment coffee. However, for those consumers who prefer heavy sediment coffee, a heavy sediment coffee dispenser (not shown) could be added at a level below dispenser 150 so as to dispense the heavy sediment coffee.

The brew chamber 104 can be formed from a brew chamber frame that defines the volumetric area where coffee solution is contained. For example, this can comprise a brew chamber frame having at least one brew chamber sidewall and a brew chamber bottom. In most instances, the brew chamber will also include a brew chamber top. The brew chamber bottom can be removable (as described in several embodiments described in this specification) or permanently attached to the brew chamber sidewall(s).

The coffee maker 100 in FIG. 1 can be operated by supplying water from a water source (not shown). The tubing from the water source can be coupled with an instant water heater 144. The instant water heater can heat the water to a temperature, for example a temperature of approximately 202° Fahrenheit. Tubing from the water heater can transport the heated water to a thermostat 148. When the water is equal to the desired temperature, such as 202° Fahrenheit, and required for brewing purposes, it can be routed to the brew chamber 104. When the water is not sufficiently hot or no longer required for brewing purposes, it can be routed to holding tank 132. The holding tank can hold heated water or excess water for use in cleaning the brew chamber when required.

Removable bottom 120 can be utilized for measuring coffee grounds. Level indicators within the removable bottom can instruct the user as to what volume of coffee grounds to insert. When a new batch of coffee is ready to be brewed, the user can add the fresh coffee grounds to the removable bottom 120 and couple the removable bottom 120 with the brew chamber 104. The hot water can then be added to the brew chamber 104. The removable bottom can be attached in a variety of ways. For example, it could be screwed on or clamped onto the bottom of the coffee maker. Or, as another example it could slide into the bottom section of the coffee maker like a drawer slides into a bureau.

Figure 4:
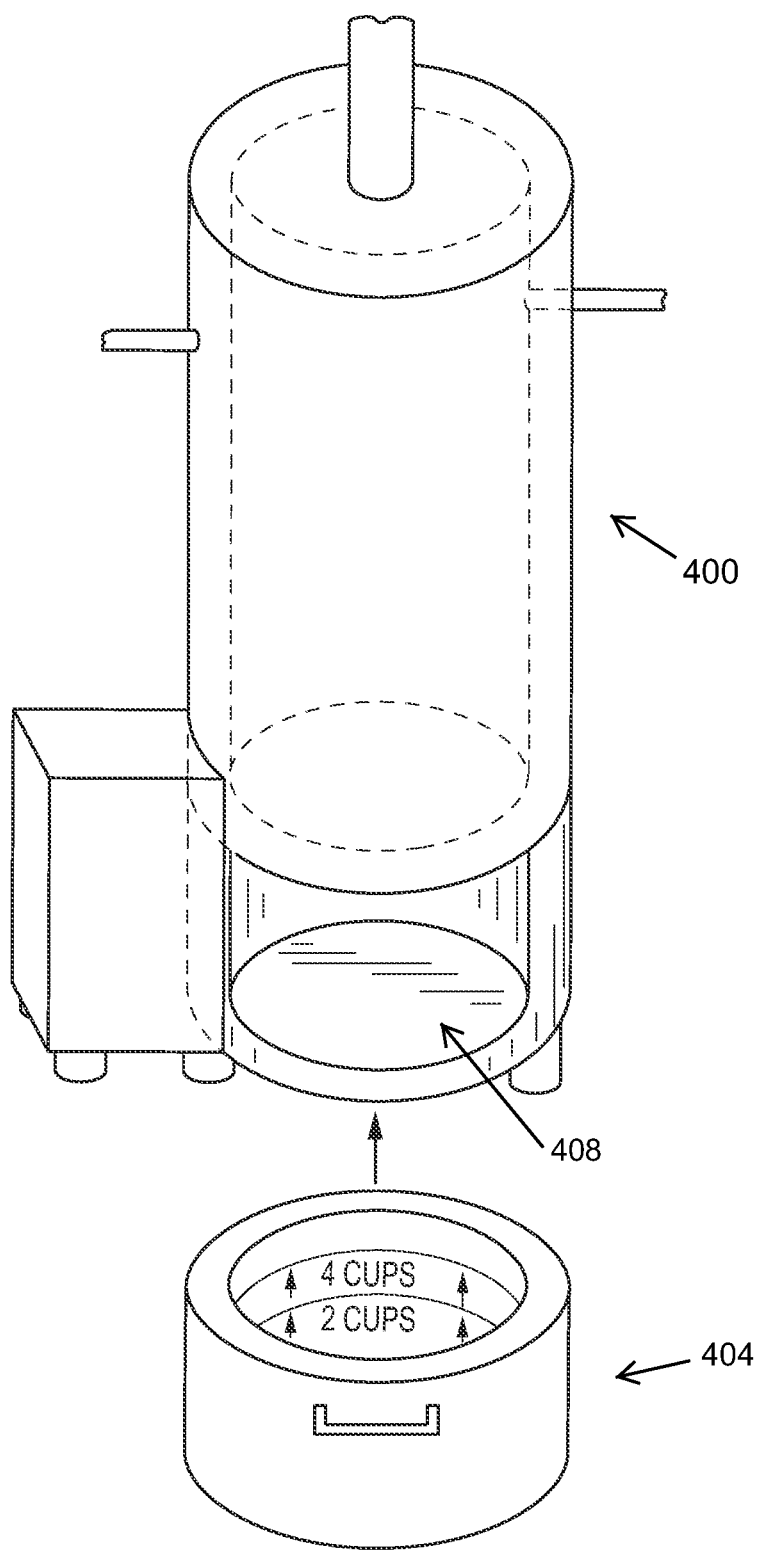
FIG. 4 illustrates a removable bottom of a coffee maker in accordance with one embodiment of the invention.

Referring now to FIG. 4, a perspective view of a coffee maker in accordance with one embodiment can be seen. FIG. 4 shows a coffee maker 400 with a removable bottom 404. The removable bottom can be inserted in socket 408 so as to establish a watertight engagement between the brew chamber frame and the removable bottom. The removable bottom is shown with pre-configured markings to allow for measurement of coffee grounds.

Once the coffee has been dispensed, the removable bottom can be removed from its socket. The used coffee grounds in the removable bottom can then be easily dumped into a waste container.

Referring again to FIG. 1, footings 136 elevate the coffee maker above the surface of the work area so as to permit easy removal of the removable bottom from the coffee maker. Furthermore, a splash pan can be provided underneath the coffee maker so as to retain any leakage.

Once the coffee grounds have been added to the brew chamber 104, the hot water can be added to the brew chamber 104. The water effectively serves as a solvent since it helps to extract the coffee oils from the coffee grounds. For purposes of this specification, therefore, one should understand the word solvent to include water. Automatic plunger 160 can be utilized once the hot water and fresh coffee grounds have had a chance to steep. For example, a waiting period of approximately four to five minutes might be utilized to allow the coffee grounds to steep in the solvent.

This also allows for the resulting foam to rise to the top of the solution. Foam chamber 122 provides an area for holding any resulting foam from the coffee brewing process. Furthermore, free space chamber 124 provides additional space so as to prevent overflow of the foam or excessive build up of pressure within the coffee maker.

After the steep period has elapsed, the automatic plunger can lower (and raise) filter screen 116. Filter screen 116 moves through brew chamber 104 so as to press coffee grounds disposed in the coffee solution into removable bottom 120. This allows the hot water to be mixed more thoroughly with the coffee grounds and to further extract any oils from the coffee grounds so as to create the coffee solution.

The filter screen 116 also presses any foam in the foam chamber 122 back into the coffee solution. This is beneficial in that it allows the flavor ingredients that were carried away by the foam to be reintroduced into the coffee solution and it also adds to the creamy taste valued by some consumers.

Each press may comprise a pressing portion followed by a releasing portion. For example, the filter screen 116 could be pressed, released slightly, pressed some more, released slightly again, pressed even more, released slightly again, and pressed a final time, followed by a slight release again. Thus, for example, four successive presses can be performed by the filter screen 116 moving from an upper position to a lower position within brew chamber 104.

It is envisioned that in accordance with one embodiment a steepage time of four to five minutes and a gradual pressing time of 20 seconds each for four consecutive presses will provide adequate filtering for a chamber of coffee. Of course, these times could be varied.

Automatic plunger assembly 160 can be used to control the filter screen 116. A plunger rod 162 between the automatic plunger motor and filter screen 116 allows the filter screen to be controlled from the top. The plunger control might also be implemented from the bottom in alternative embodiments. A computer system, such as the computer system shown in FIG. 5 can be utilized to control the plunger motor so as to cause the plunger rod to lower and raise the filter screen at desired intervals. A collapsible or telescoping plunger rod could be used in one embodiment to minimize the height of the device.

Figure 2:
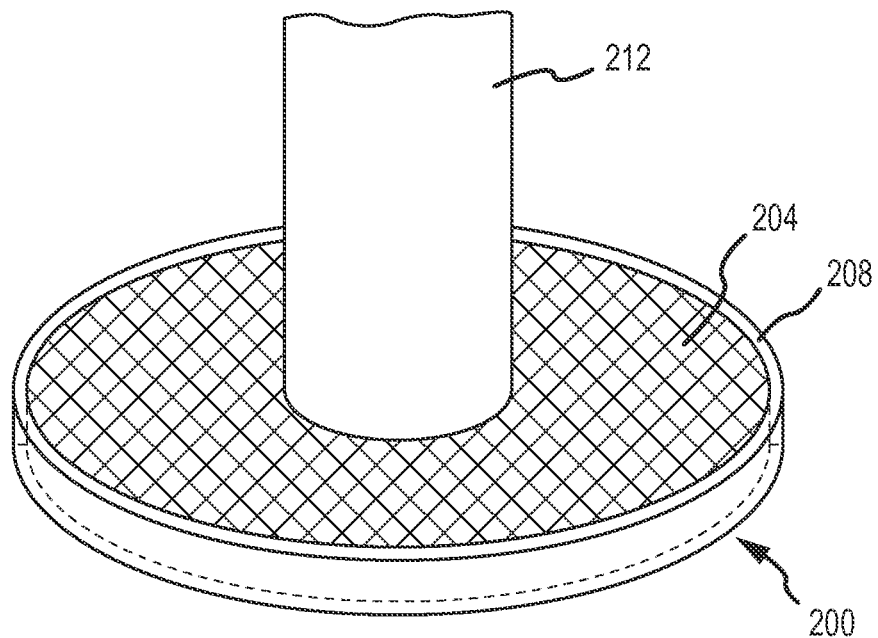
FIG. 2 illustrates a filter screen and squeegee combination in accordance with one embodiment of the invention.

Referring now to FIG. 2, an embodiment of a filter screen can be seen. Filter screen 200 can be comprised of a wire mesh 204 and an outer squeegee surface 208. The wire mesh can be configured with openings sufficiently small so as to prevent coffee grounds from passing through while allowing coffee solution to pass through. The squeegee material can be configured to engage the sidewall of the brew chamber so as to be able to squeegee any coffee oils adhering to the sidewall into the coffee solution during brewing. Similarly the squeegee can be used during cleaning to clean the brew chamber of material disposed on the brew chamber side walls. A plunger rod 212 couples to the filter screen so as to control the movement of the filter screen in the brew chamber.

In an alternative embodiment, the squeegee could be utilized separately from the filter screen. This would allow the squeegeeing to occur separately from the filtering.

Figure 3:
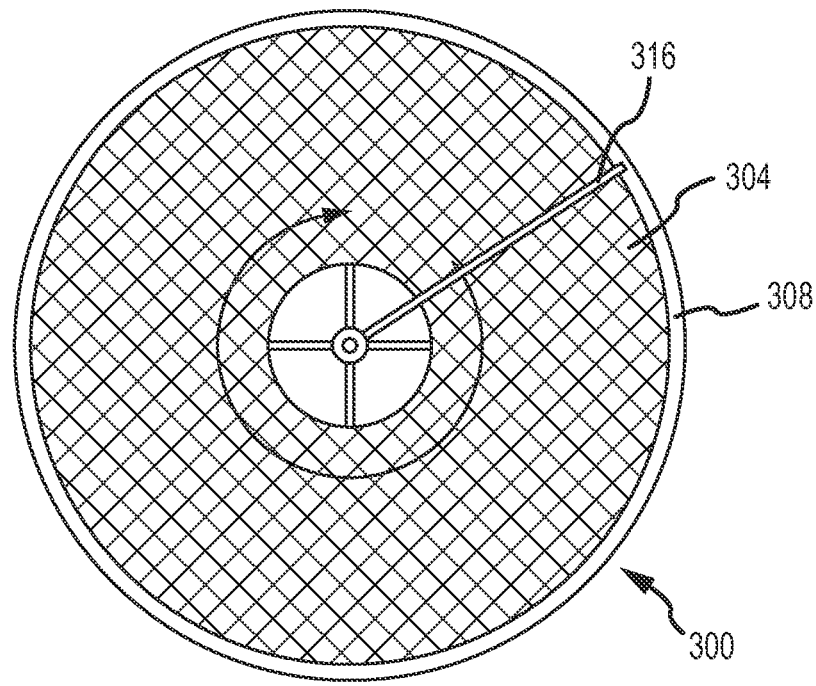
FIG. 3 illustrates a filter screen sweeper in accordance with one embodiment of the invention.

FIG. 3 illustrates a bottom view of a filter screen in accordance with another embodiment. In the embodiment shown in FIG. 3, the filter screen 300 is provided with a wire mesh 304, an outer squeegee 308, and a sweeper arm or scraper 316. The sweeper arm is coupled with a shaft in the core of the plunger rod that causes the sweeper arm to rotate along the bottom of the filter screen. This serves to brush any coffee grounds stuck in the filter screen out of the filter screen so that they can fall away from the filter screen to the bottom of the brew chamber. Thus, a clean filter screen can be obtained intermittently while pressing so as to allow more effective pressing and filtering of the coffee grounds.

Referring again to FIG. 1, it is notable that a gasket or squeegee 118 can be configured around filter screen 116 so as to provide a fluid tight engagement with the inner surface of brew chamber 104. For example, medical grade syringe material could be utilized for the gasket material to ensure a high quality engagement with surfaces of brew chamber 104. The tight engagement allows the gasket to squeegee the oils from the coffee solution off of the inner surface of the sidewall of the brew chamber 104. This not only deposits the oils back into the solution but also cleans the surfaces of the brew chamber. Thus, better taste is achieved for the coffee and prevention of build up of oils along the inner surface of the brew chamber is accomplished as well. A build up of old oil on the brew chamber surface could result in a detrimental effect on the taste of later batches of coffee.

Water holding tank 132 can provide an energy efficient cleaning of the coffee maker. Namely, unused hot water can be stored in tank 132 for use in cleaning brew chamber 104. Pump 140 can pump out the hot water from holding tank 132 to the brew chamber 104 via tubing 154. Thus, an energy efficiency can be achieved from utilizing waste hot water held in tank 132 to clean brew chamber 104 without the need to heat additional water. Of course some additional hot water could be utilized as needed. It could either be added via holding tank 132 or added directly via thermostat 148 into the brew chamber.

A brewed batch of coffee can be stored in brew chamber 104 until dispensed. Alternatively, once brewed, some or all of the brewed coffee can be transferred to a holding tank. This would prevent overbrewing of the coffee solution due to prolonged exposure to the coffee grounds. Thus, it might allow for unused coffee to be stored temporarily for later dispensing.

A vacuum pocket 128 can be utilized around brew chamber 104 to provide additional insulation so as to maintain the brewed coffee at a high temperature. Alternatively, cork or other insulated material can be utilized in place of or in addition to vacuum pocket 128. A spigot or dispenser 150 can be provided above the heavy sediment coffee layer so as to dispense the brewed coffee that is drinkable. Additionally, a dispenser can be provided at the heavy sediment layer so as to provide the option of dispensing a heavier sediment type of brewed coffee.

When the brewed coffee has been utilized and the coffee maker is ready for cleaning, the removable bottom 120 can be removed. The used coffee grounds will be disposed in the removable bottom. Thus, the removable bottom serves as a convenient and non-messy device for removing the coffee grounds from the coffee maker for easy disposal. The removable bottom can simply be inverted to dump the used coffee grounds into a waste container.

Thus, in accordance with one embodiment, an automatic non-paper-filtered coffee maker can be achieved that brews large batches of coffee. This not only allows greater taste to be achieved but provides a device for use in commercial establishments rather than a simple home use device. It also provides a coffee maker that does not result in bitter tasting coffee after prolonged use.

In accordance with another embodiment, an energy efficient coffee maker is achieved that can provide for easy cleaning while reducing the need to heat water unnecessarily. For example, gray water diverted to the water holding tank 132 can be utilized to clean other products. In addition, energy efficiency can be achieved by utilizing an insulated brew chamber that does not require the device to be powered constantly but rather allows the device to brew a single batch of coffee and hold it in the brew chamber at high temperatures for a prolonged period of time, such as five hours. Commercial coffee makers typically are powered constantly and are much less energy efficient.

In accordance with another embodiment, sediment from the coffee brewing process (not to be confused with used coffee grounds that are retained by the filter screen) can be retained at the bottom of the coffee solution below the dispensing spigot. In regular French Press brewers, the heavy sediment is retained in the solution of coffee and dispensed as part of the coffee solution, causing a co-mingling of the heavy sediment with the preferred solution. Thus, by dispensing the coffee solution from spigot 150 this problem can be avoided.

A hot water dispenser 149 for tea and other hot non-coffee drinks can be provided after the hot water heater and before the coffee tank to allow for the dispensing of hot water. The hot water dispenser could similarly be located at other locations in the hot water line.

In accordance with one embodiment, the apparatus could be used to brew tea instead of coffee. In such an embodiment, tea leaves or tea grounds could be added to the removable container and a batch of tea could be brewed in the manner described above.

Figure 5:
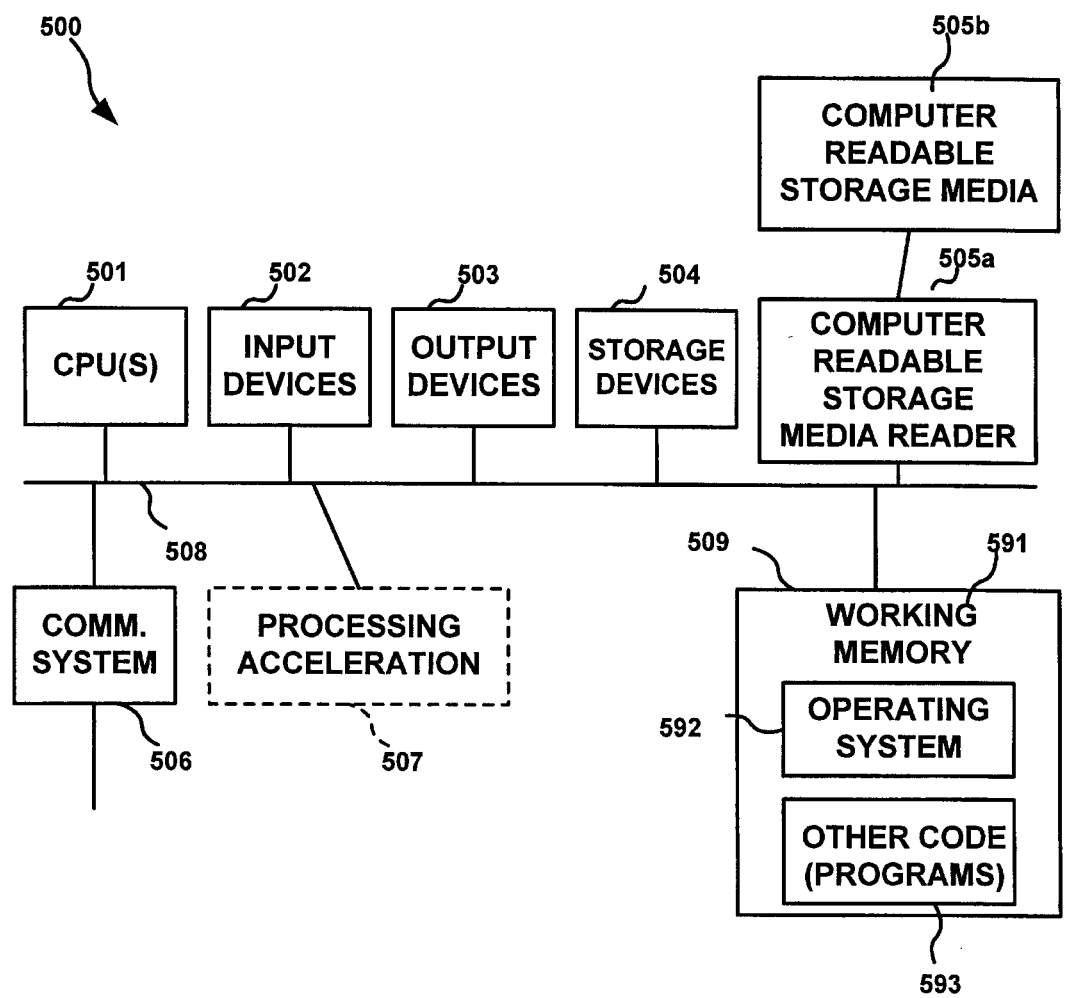
FIG. 5 illustrates a block diagram of a computer system for use with a coffee maker in accordance with one embodiment of the invention.

FIG. 5 illustrates a computer system that can be utilized to operate the coffee maker in various embodiments. For example, the computer system could be used to program various brewing cycles for different types of coffee or tea. And, the computer could be programmed to accomplish different pressing cycles and brushing cycles by the filter screen and filter screen brush. Similarly, where a squeegee is used independently of a filter screen, the squeegee and filter screen could be controlled via their independent plunger rods.

FIG. 5 broadly illustrates how individual computer system elements can be implemented. System 500 is shown comprised of hardware elements that are electrically coupled via bus 508, including a processor 501, input device 502, output device 503, storage device 504, computer-readable storage media reader 505a, communications system 506 processing acceleration (e.g., DSP or special-purpose processors) 507 and memory 509. Computer-readable storage media reader 505a is further coupled to computer-readable storage media 505b, the combination comprehensively representing remote, local, fixed and/or removable storage devices plus storage media, memory, etc. for temporarily and/or more permanently containing computer-readable information, which can include storage device 504, memory 509 and/or any other such accessible system 500 resource. System 500 also comprises software elements (shown as being currently located within working memory 591) including an operating system 592 and other code 593, such as programs, applets, data and the like. As used herein, the term 'processor' includes any of one or more circuits, processors, controllers, filed-programmable gate arrays (FPGAs), microprocessors, application-specific integrated circuits (ASICs), other types of computational devices, or combinations thereof that are capable of performing functions ascribed to or associated with the processor.

Figure 6A:
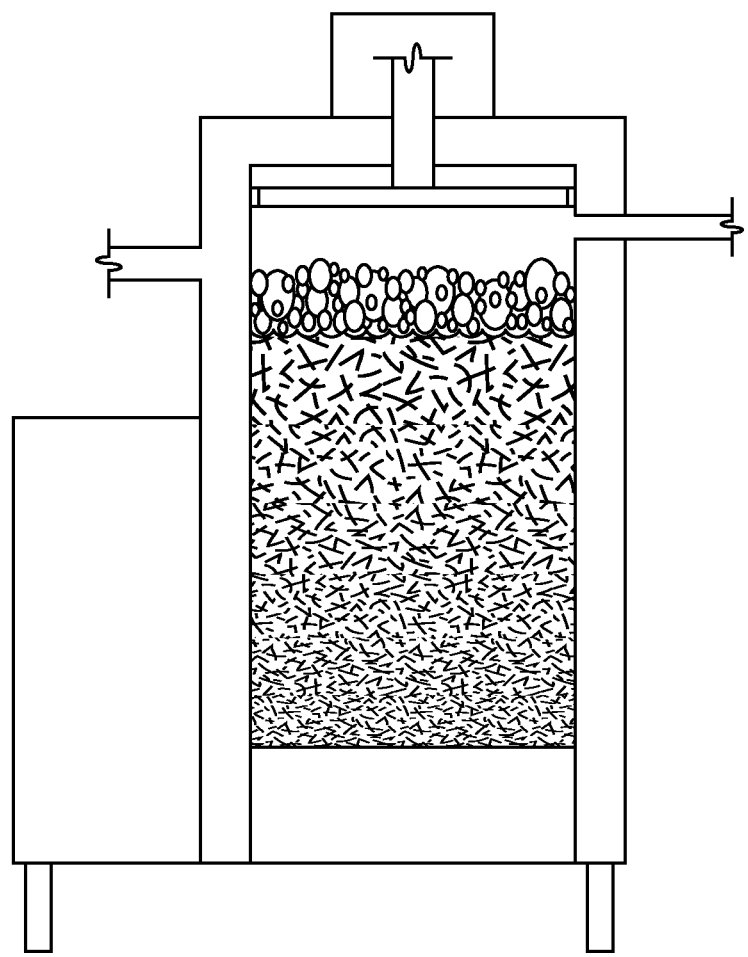
FIGS. 6A, 6B, 6C, 6D, 6E, 6F, 6G, and 6H illustrate an example of preparing coffee in accordance with one embodiment of the invention.
Figure 6B:
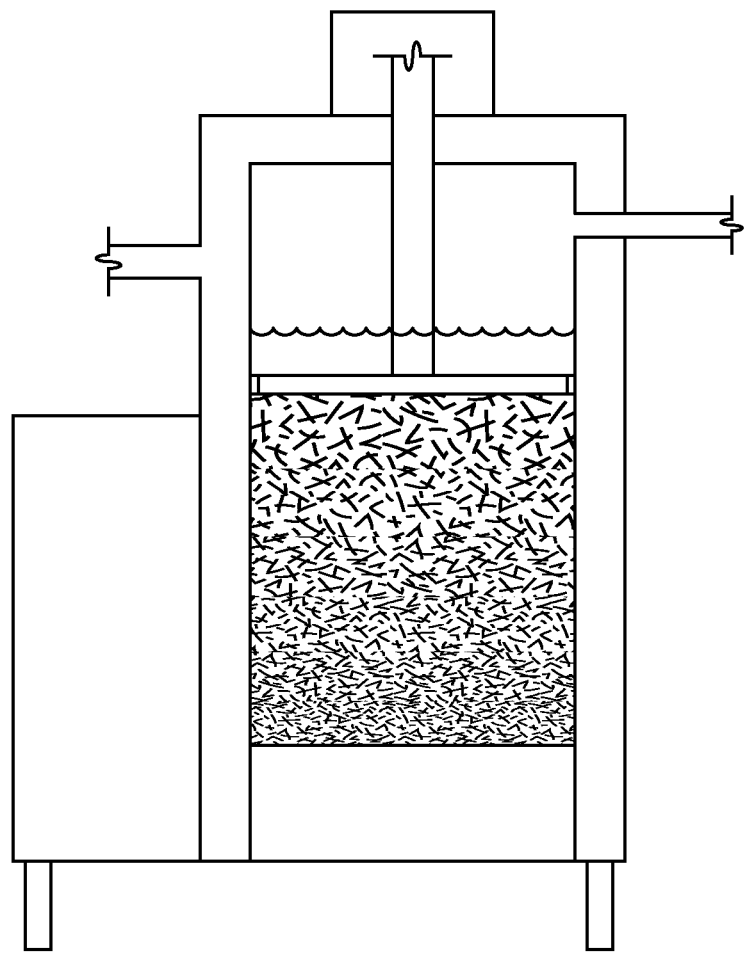

Referring now to FIGS. 6A, 6B, 6C, 6D, 6E, 6F, 6G, and 6H, a method of pressing coffee grounds during a brewing process can be seen. In FIG. 6A, a brew chamber is shown with coffee grounds steeping in hot water. Foam produced from the steeping of the coffee grounds is shown at the top of the solution. The filter screen is shown at the top of the brew chamber. In FIG. 6B, the filter screen has now been pressed down into the coffee solution. In doing so, the filter screen has pushed the foam back down into the coffee solution. The coffee grounds are also shown as more concentrated, as the filter screen has forced some of the coffee grounds at the top further towards the bottom of the solution.

Figure 6C:
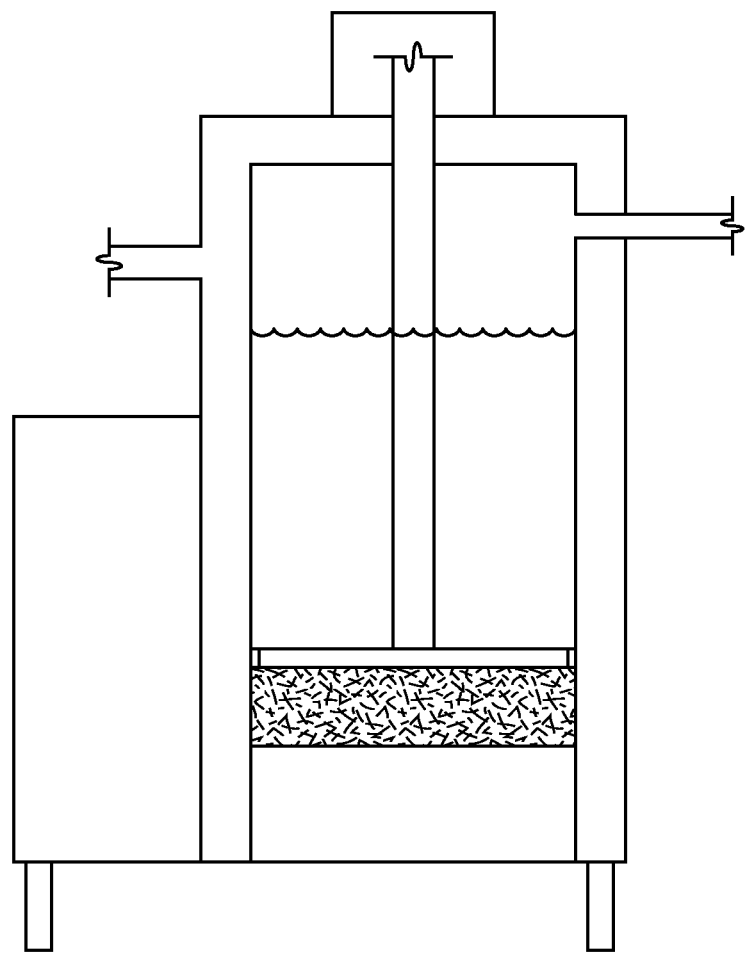
Figure 6D:
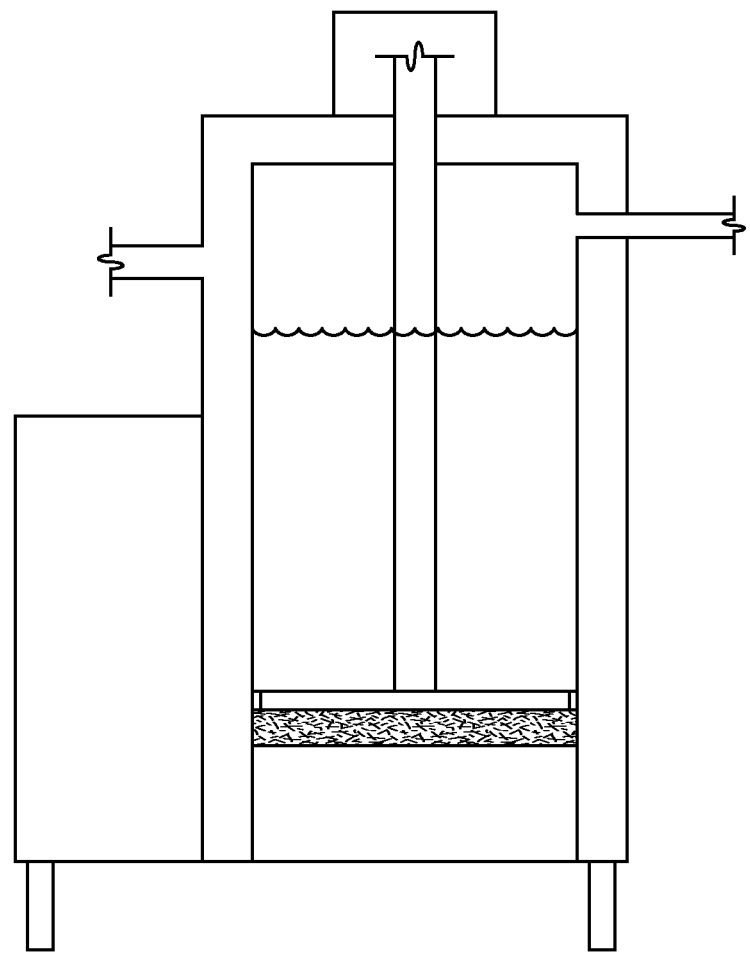

In FIGS. 6C and 6D, the filter screen is shown further down into the coffee solution. The coffee grounds at these stages are becoming more concentrated.

Figure 6E:
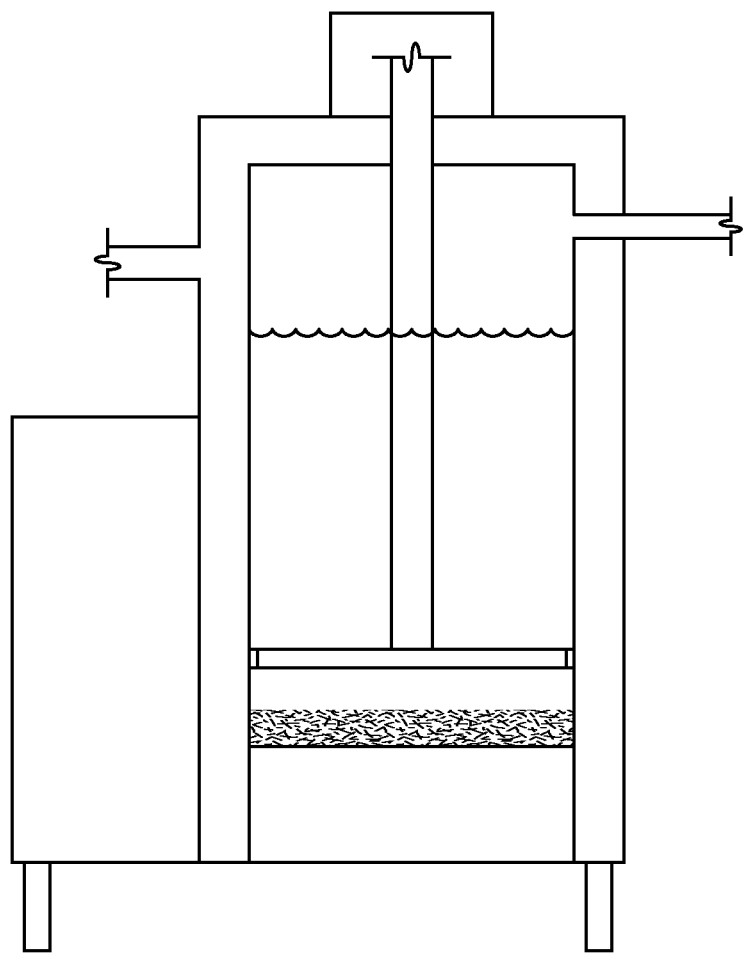

The coffee maker may be programmed to operate by pushing the coffee grounds slowly near the bottom of the brew chamber and then raising the filter screen to a higher position. FIG. 6E shows the filter screen raised to a higher position than shown in FIG. 6D. For example, one might choose to have the filter screen raised one inch. This allows pressure to be released from the pressed coffee grounds. It also allows any fluid, such as coffee oil, that was released from the pressed coffee grounds to emigrate to the coffee solution from the mass of pressed coffee grounds. And, it provides an opportunity for any coffee grounds that are clogging the filter screen to be cleared from the filter screen.

Figure 6F:
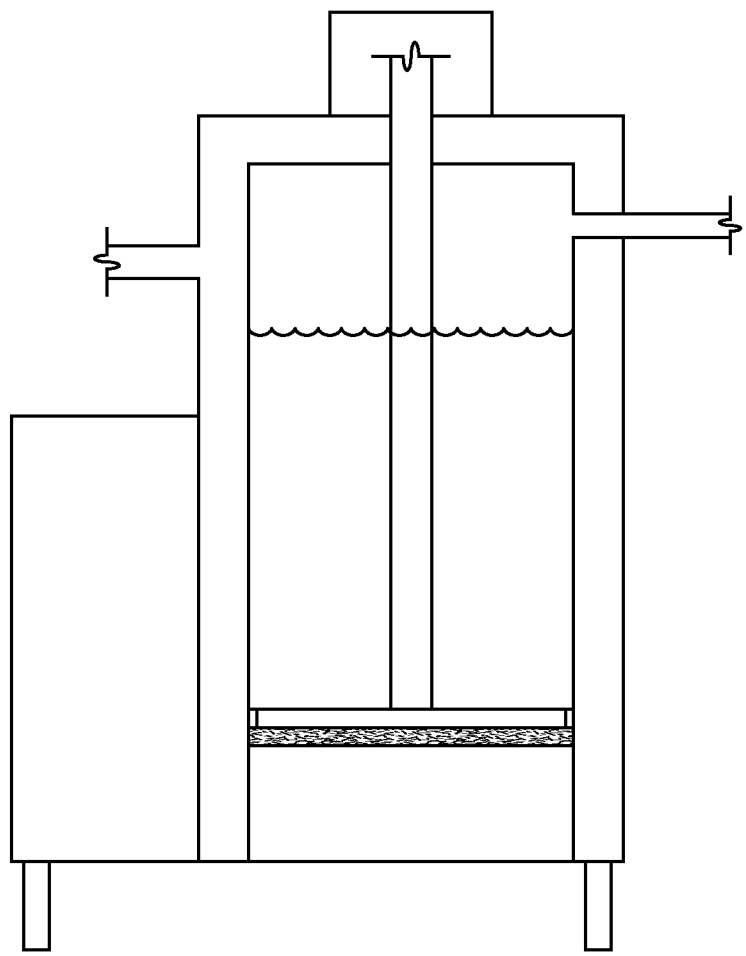
Figure 6G:
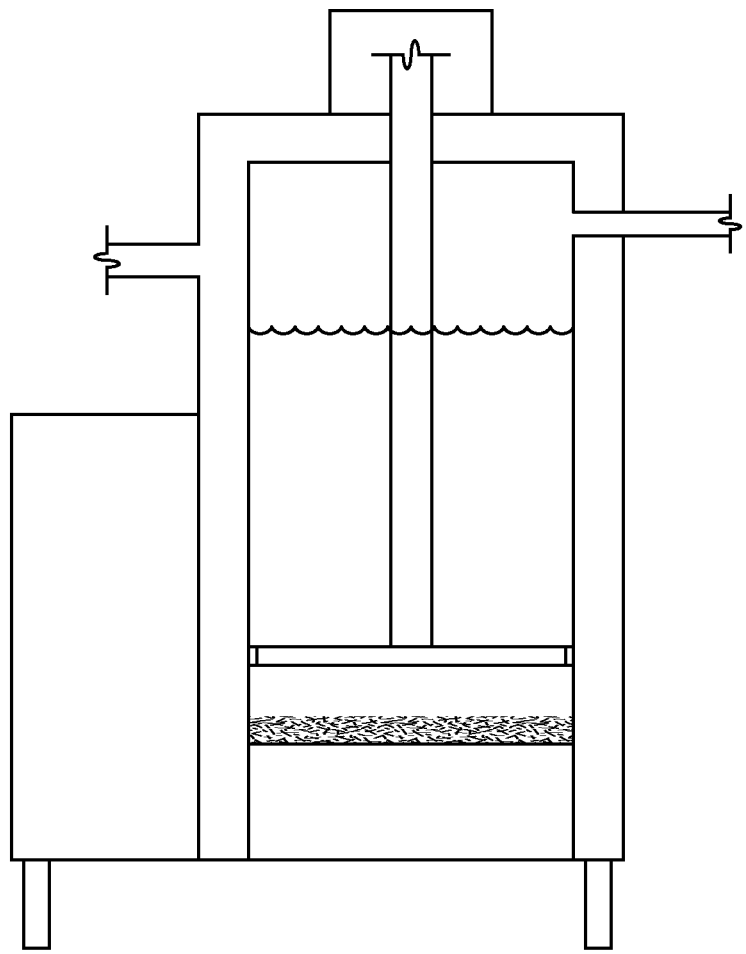
Figure 6H:
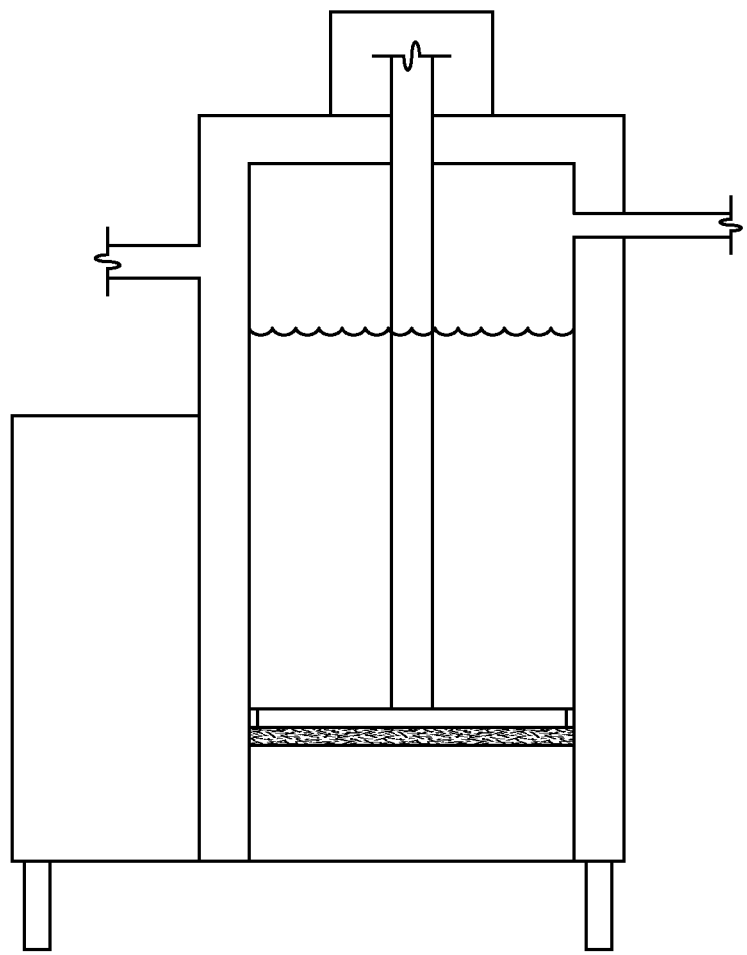

In FIG. 6F, the coffee maker is shown pressing the coffee grounds even further. And, in FIG. 6G, the filter is again shown in a raised position. FIG. 6H shows a final press position which traps the pressed coffee grounds between the filter screen and removable bottom of the brew chamber. This helps to keep coffee grounds from being dispensed by the spigot valve.

Figure 7A:
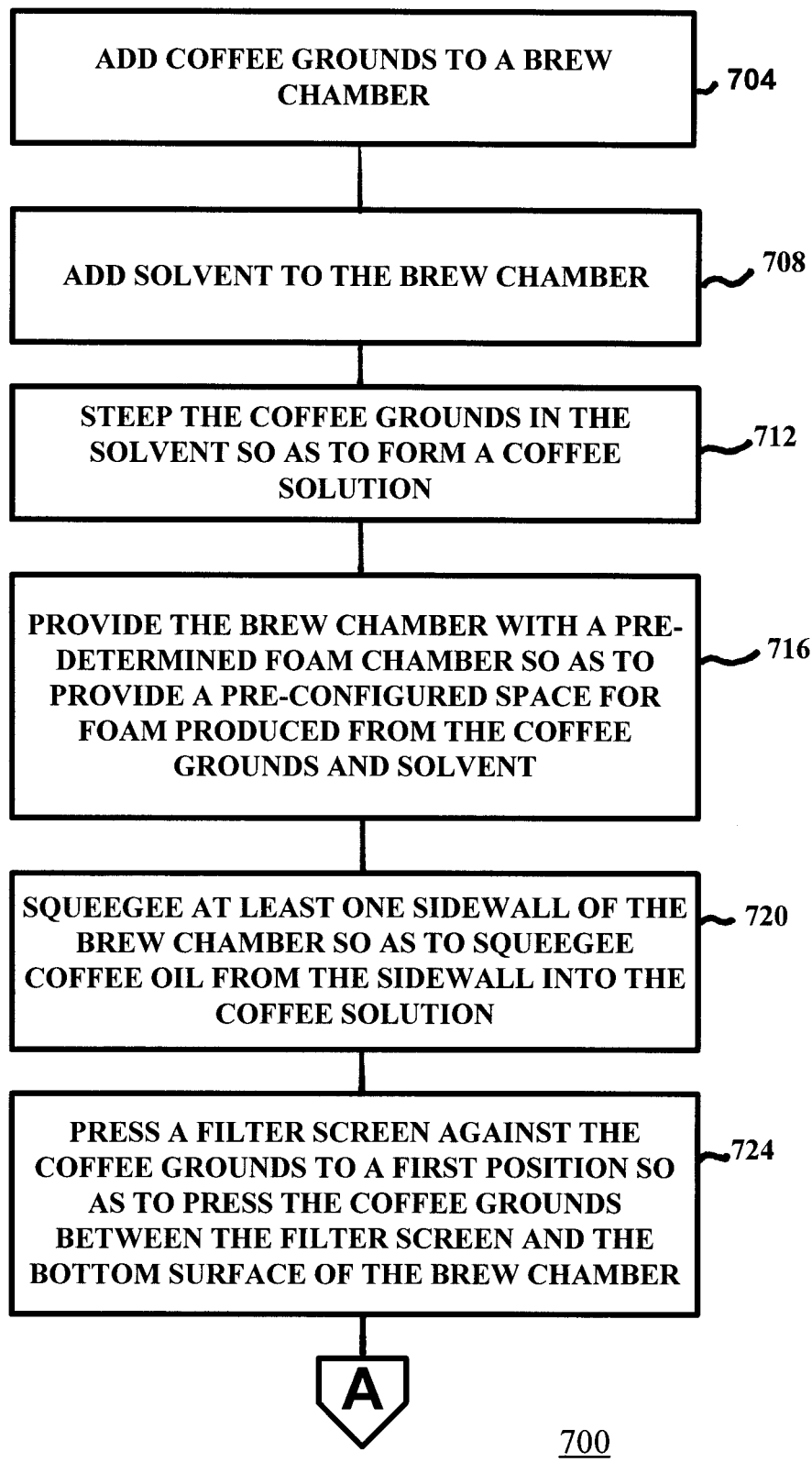
FIG. 7A, 7B and 7C illustrates a flow chart demonstrating a method of brewing coffee in accordance with one embodiment of the invention.
Figure 7B:
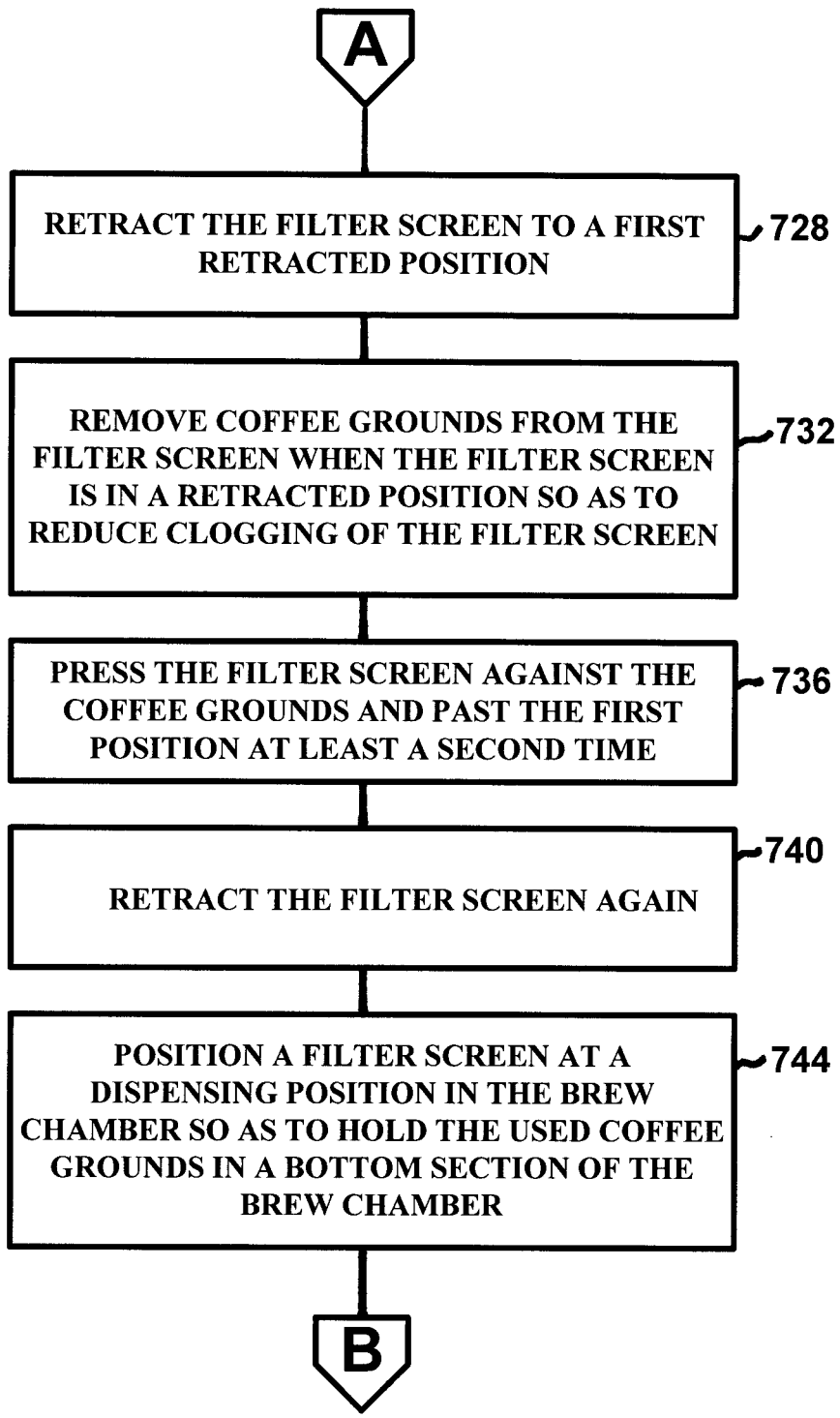
Figure 7C:
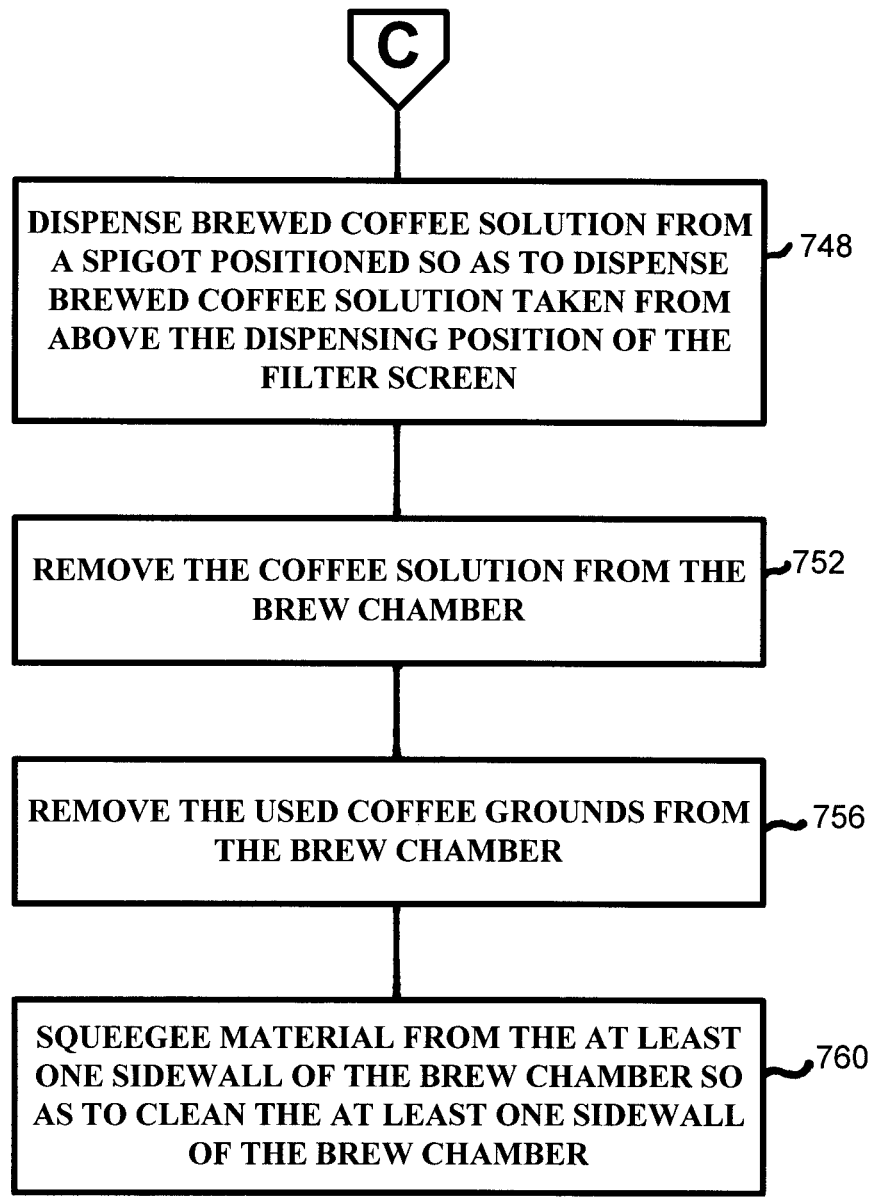

Referring now to FIG. 7, a flow chart 700 illustrates one method of operating a coffee maker in accordance with one embodiment. Block 704 shows that coffee grounds are added to a brew chamber. In block 708, solvent, such as water, is added to the brew chamber. The coffee grounds can then be steeped in the solvent so as to form a coffee solution, as shown by block 712.

The brew chamber can be configured with a foam chamber of pre-determined size. The foam chamber allows room for foam to form during the steeping of the coffee grounds. This foam can later be pushed back in to the coffee solution, as desired. The foam is in some instances an important part of the brewing process in that it adds texture to the coffee solution.

In block 720, the squeegee can be used to squeegee at least one sidewall of the brew chamber. In some instances, the brew chamber may only have one sidewall, as it will be circular. However, other designs might choose to use multiple sidewalls. Block 724 shows that a filter screen can be used to press the coffee grounds towards the bottom of the brew chamber. When the coffee grounds become concentrated enough, the filter screen will press the coffee grounds between the filter screen and the bottom surface of the brew chamber. In one embodiment, the bottom surface is formed by a removable bottom of the brew chamber.

Block 728 illustrates that the filter screen can be retracted to a first retracted position. As explained above, this retracted position allows for pressure to be released, for example. In one embodiment, coffee grounds can also be removed from the filter screen when the filter screen is in the raised position, as shown in block 732.

The removal of the coffee grounds from the coffee screen could be implemented in a variety of ways. As a first example, the filter screen once in the retracted position could be moved up and down by the plunger rod in rapid succession so as to shake free any coffee grounds lodged in the filter screen. This could be programmed into computer system 500 to occur automatically. As another example, the scraper arm described above in conjunction with FIG. 3 could be used to scrape the bottom of the filter so as to dislodge stuck coffee grounds. As yet another example, a vibrational force generator could be utilized. Such a vibrational force generator could be positioned at alternative positions on the coffee brewing apparatus. For example, it could be mechanically coupled to plunger rod 162 in plunger assembly 160 as vibrational force generator 170 in FIG. 1. Or, it could take the form of a mat 180 that sits under the entire coffee apparatus and causes the entire apparatus to vibrate so as to shake free coffee grounds. Once the coffee grounds are dislodged from the filter screen they will be free to fall to the bottom of the brew chamber.

It should be noted that the apparatus can be configured to provide agitation during the brewing of the coffee. This would allow the coffee grounds to circulate more in the coffee solution. There are a variety of ways that this could be accomplished. In one way, vibration could be used to cause the fluid in the brew chamber to vibrate. For example, this could be accomplished with the vibrational elements described above. In addition, the filter screen could be used to agitate the solution in the brew chamber. This might occur, for example, during the steeping process where the filter screen is pushed down into the coffee solution at the beginning or during the steeping process in a rapid manner so as to force the solution to move and circulate. This would help in one embodiment to cause the coffee grounds to move away from the bottom of the brew chamber and re-distribute throughout the solution. In addition, inserting the filter screen into the solution and causing the scraper arm to revolve could also be useful in causing the coffee solution to be agitated. In some embodiments, the scraper arm could be configured with a height sufficient to move more solution, e.g., a height of 1 to 2 inches. The axis of the scraper arm could be inclined as well to impart a greater downward or greater upward circulation of the coffee solution.

Referring again to flow chart 700, blocks 736 and 740 illustrate that the process can be continued for another round of additional pressing and retraction, as desired.

Once the pressing has been completed, the filter screen can be positioned in a dispensing position in the brew chamber. This allows the filter screen to retain the trapped coffee grounds between the filter screen and the bottom of the brew chamber, as shown by block 744. The brewed coffee solution can then be dispensed from a spigot positioned on the brew chamber.

Once the coffee has been dispensed, any remaining coffee solution can be removed from the brew chamber, as shown by block 752. Then, the used coffee grounds can be removed from the brew chamber, as shown in block 756. This can be performed for example by removing a removable bottom from the brew chamber. The squeegee can then be used to squeegee material disposed on the sidewall(s), as shown by block 760.

Figure 8A:
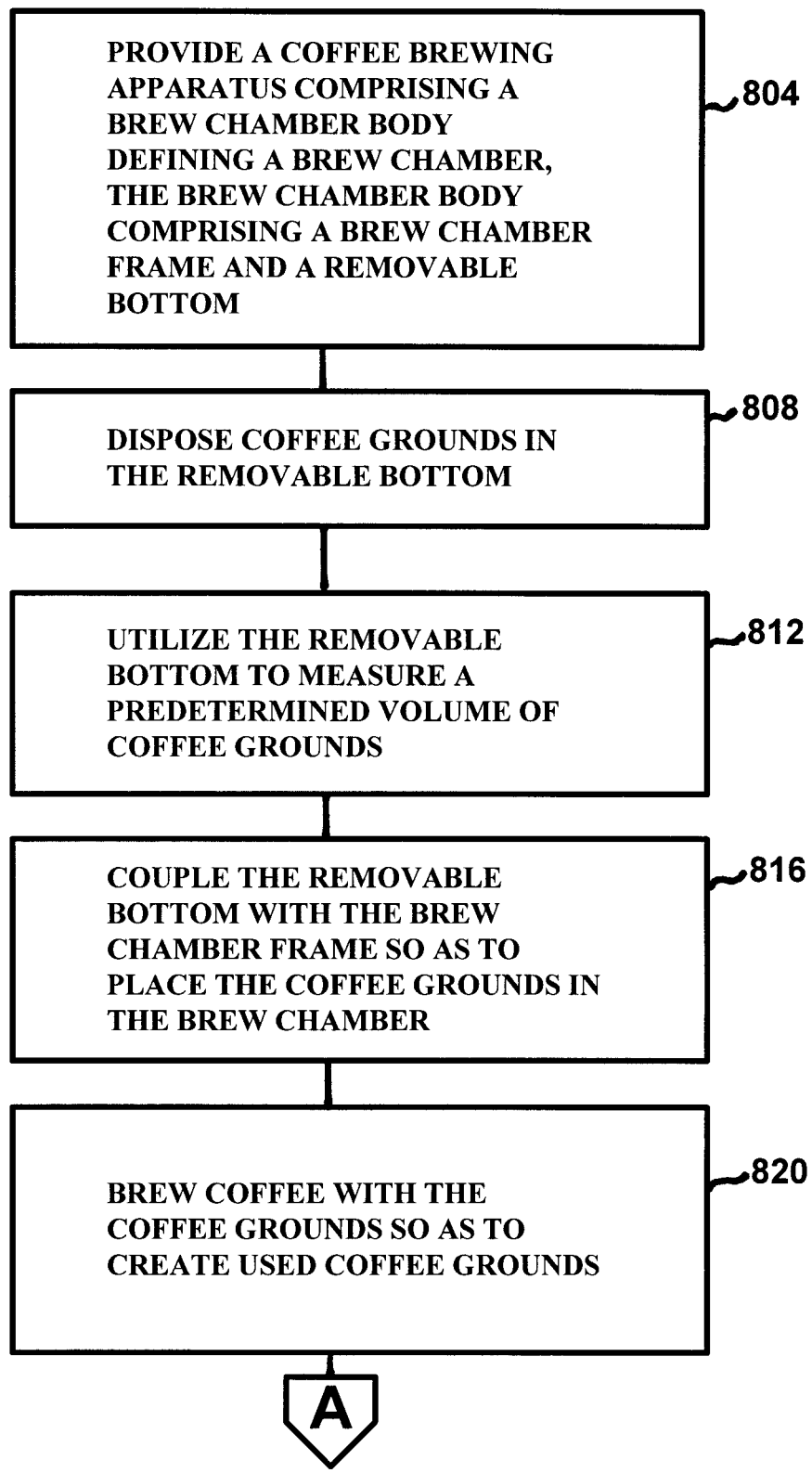
FIG. 8A and 8B illustrates a flow chart demonstrating a method of using a removable bottom in a coffee maker in accordance with one embodiment of the invention.
Figure 8B:
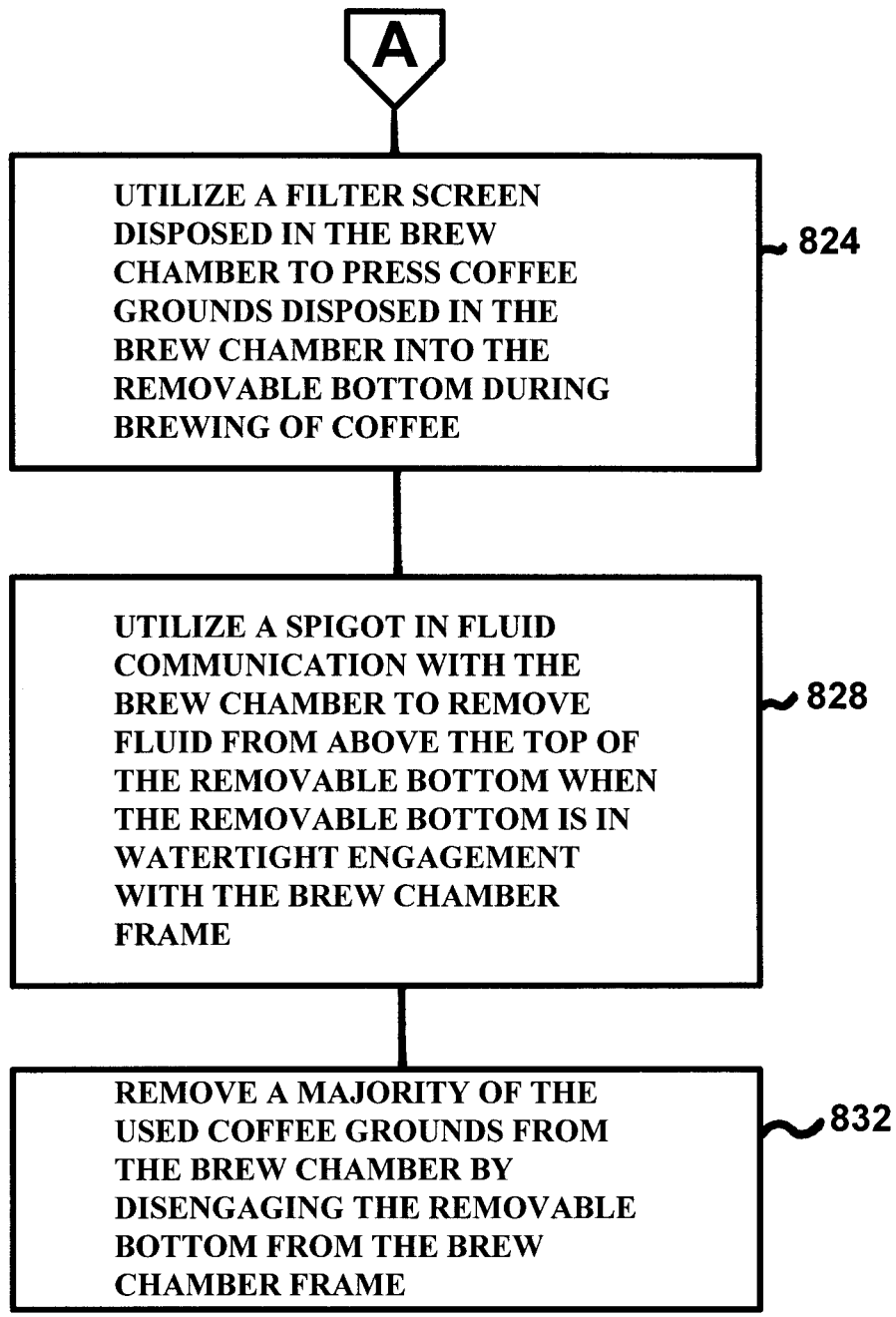

FIGS. 8A and 8B illustrate a flow chart 800 demonstrating a method of using a removable bottom to both add new coffee grounds to a brew chamber and remove the same coffee grounds after use. In block 804, a coffee brewing apparatus is provided. The coffee brewing apparatus can have a brew chamber body that defines a brew chamber. For example a brew chamber frame and a removable bottom that couples to the brew chamber frame can be provided.

In block 808 and 812, the removable bottom is utilized to measure the appropriate amount of coffee grounds for brewing the desired amount of coffee solution. And, by coupling the removable bottom to the brew chamber frame, the coffee grounds are effectively disposed in the brew chamber, as shown by block 816. A solvent, such as hot water, can then be added to the brew chamber. And, as shown by block 820 coffee solution can be brewed. This results in used coffee grounds after the brewing is completed.

A filter screen disposed in the brew chamber can be used to press the coffee grounds disposed in the brew chamber into the removable bottom, as shown by block 824. The coffee solution can be dispensed as shown by block 828. For example, a spigot can be used to remove the fluid from above the top of the removable bottom while the removable bottom is in watertight engagement with the brew chamber frame.

With the bulk of used coffee grounds disposed in the removable bottom, removal of the removable bottom allows the bulk of used coffee grounds to be removed from the brew chamber, as shown by block 832

It is noted that many of the structures, materials, and acts recited herein can be recited as means for performing a function or step for performing a function. Therefore, it should be understood that such language is entitled to cover all such structures, materials, or acts disclosed within this specification and their equivalents, including any matter incorporated by reference.

It is thought that the apparatuses and methods of embodiments described herein will be understood from this specification. While the above description is a complete description of specific embodiments, the above description should not be taken as limiting the scope of the patent as defined by the claims.

What is claimed is:

1. An apparatus for brewing coffee comprising:
a brew chamber body defining a brew chamber, the brew chamber body comprising:
a brew chamber frame; and
a removable bottom and sidewall portion;
wherein the removable bottom and sidewall portion is configured to add fresh coffee grounds to the brew chamber during use of the apparatus;
wherein the removable bottom and sidewall portion is configured for watertight engagement with the brew chamber frame;
wherein the removable bottom and sidewall portion is configured to remove a majority of used coffee grounds from the brew chamber when the removable bottom is disengaged from the brew chamber frame during use of the apparatus; and
wherein the removable bottom and sidewall portion defines an internal surface portion of the brew chamber and an external surface portion of the brew chamber body.

2. The apparatus as claimed in claim 1 and further comprising:
at least one measurement indicator in the removable bottom and sidewall portion configured to indicate a volume of measurement for coffee grounds disposed in the removable bottom and sidewall portion.

3. The apparatus as claimed in claim 1 and further comprising:
a filter screen configured for pressing coffee grounds disposed in the brew chamber into the removable bottom and sidewall portion during brewing of coffee.

4. The apparatus as claimed in claim 3 and further comprising:
a coffee grounds remover for removing coffee grounds from the filter screen when the filter screen is in a retracted position so as to reduce clogging of the filter screen.

5. The apparatus as claimed in claim 3 and further comprising an automatic shaker to dislodge coffee grounds from the filter and to cause the coffee grounds to fall into the removable bottom.

6. The apparatus as claimed in claim 3 and further comprising:
a scraper configured for scraping the bottom of the filter so as to dislodge coffee grounds from the filter and to cause the coffee grounds to fall into the removable bottom.

7. The apparatus as claimed in claim 3 and further comprising:
a vibrational force generator configured to produce vibrational forces to dislodge coffee grounds from the filter and to cause the coffee grounds to fall into the removable bottom.

8. The apparatus as claimed in claim 1 and further comprising a spigot in fluid communication with the brew chamber wherein the spigot is configured to remove fluid from above the top of the removable bottom and sidewall portion when the removable bottom is in watertight engagement with the brew chamber frame.

9. A method of adding coffee grounds to a brew chamber, the method comprising:
providing a coffee brewing apparatus comprising:
a brew chamber body defining a brew chamber, the brew chamber body comprising:
a brew chamber frame; and
a removable bottom and sidewall portion;
disposing coffee grounds in the removable bottom and sidewall portion;
coupling the removable bottom and sidewall portion with the brew chamber frame so as to place the coffee grounds in the brew chamber;
brewing coffee with the coffee grounds so as to create used coffee grounds;
removing a majority of the used coffee grounds from the brew chamber by disengaging the removable bottom and sidewall portion from the brew chamber frame so as to disengage an internal surface portion of the brew chamber formed by the removable bottom and so as to disengage an external surface portion of the brew chamber body formed by the removable bottom and sidewall portion.

10. The method as claimed in claim 9 wherein said disposing coffee grounds in the removable bottom and sidewall portion comprises utilizing the removable bottom and sidewall portion to measure a predetermined volume of coffee grounds.

11. The method as claimed in claim 9 and further comprising:
utilizing a filter screen disposed in the brew chamber to press coffee grounds disposed in the brew chamber into the removable bottom and sidewall portion during brewing of coffee.

12. The method as claimed in claim 9 and further comprising utilizing a spigot in fluid communication with the brew chamber to remove fluid from above the top of the removable bottom and sidewall portion when the removable bottom and sidewall portion is in watertight engagement with the brew chamber frame.

13. An apparatus for use in brewing coffee, said apparatus comprising:
a brew chamber body defining a brew chamber, the brew chamber body comprising:
a brew chamber frame comprising:
at least one brew chamber sidewall; and
a removable bottom defining an internal surface portion of the brew chamber and an external surface portion of the brew chamber body;
a movable squeegee disposed in the brew chamber;
wherein during brewing of a brew of coffee in the brew chamber, the squeegee is configured to squeegee oil disposed on the at least one sidewall back into the brew of coffee;
wherein during cleaning of the brew chamber the squeegee is operative to squeegee material disposed on the at least one sidewall into a cleaning solution disposed in the brew chamber;
wherein the removable bottom is operative to add fresh coffee grounds to the brew chamber during use of the apparatus;
wherein the removable bottom is configured for watertight engagement with the brew chamber frame; and wherein the removable bottom is operative to remove the bulk of used coffee grounds from the brew chamber by disengaging the removable bottom from the brew chamber frame during use of the apparatus;

wherein the brew chamber is pre-configured to have a foam chamber so as to provide a pre-configured space for foam produced from the brewing of coffee.

* * * * *